United States Patent [19]
Thurston et al.

[11] Patent Number: 5,390,774
[45] Date of Patent: Feb. 21, 1995

[54] ELECTROMAGNETIC CLUTCH WITH IMPROVED GUIDANCE AND RETENTION

[75] Inventors: Michael G. Thurston, Buffalo; Paul A. Szalach, Amherst, both of N.Y.

[73] Assignee: General Motors Corporation, Detroit, Mich.

[21] Appl. No.: 126,418

[22] Filed: Sep. 27, 1993

[51] Int. Cl.⁶ .......................... F16D 3/76; F16D 27/10
[52] U.S. Cl. ................. 192/106.1; 192/84 C; 464/89
[58] Field of Search .............. 192/84 C, 106.1; 464/89; 417/319

[56] References Cited

U.S. PATENT DOCUMENTS

| | | | |
|---|---|---|---|
| 3,384,213 | 5/1968 | Bernard et al. | 192/84 |
| 3,565,223 | 2/1971 | Pierce | 192/84 |
| 3,727,431 | 4/1973 | Yokel . | |
| 3,762,516 | 10/1973 | Matsushita | 192/84 C |
| 3,861,172 | 1/1975 | Symann . | |
| 4,385,893 | 5/1983 | Kirschey | 464/17 |
| 4,560,367 | 12/1985 | Wolf et al. | 192/106.1 X |
| 4,850,244 | 7/1989 | Eckel et al. | 74/574 |
| 4,852,424 | 8/1989 | Grassmuck et al. | 74/574 |
| 5,195,625 | 3/1993 | Chang et al. | 192/84 C |
| 5,219,273 | 6/1993 | Chang | 464/89 X |

FOREIGN PATENT DOCUMENTS 63-130928  6/1988  Japan ................ 192/84 C

*Primary Examiner*—Rodney H. Bonck
*Attorney, Agent, or Firm*—Patrick M. Griffin

[57] ABSTRACT

An electromagnetic air conditioning compressor clutch of the type that mounts the armature through an elastomeric pad. The flexibility of the pad can lead to undesired radial whirl of the armature about the shaft of the compressor, which is compensated for without affecting the flexibility of the pad. The armature is fixed to the outer edge of the pad by an outer ring which has an axially extending, cylindrical sleeve. A guide plate fixed to the compressor shaft has a cylindrical guide flange that axially overlaps the outer ring sleeve, closely, but slidably. The ring, and the armature, can therefore move axially as the pad is flexed, but are guided radially and circumferentially.

3 Claims, 2 Drawing Sheets

ELECTROMAGNETIC CLUTCH WITH IMPROVED GUIDANCE AND RETENTION

This invention relates to electromagnetic clutch assemblies for vehicle air conditioning compressors in general, and specifically to an improved clutch of the type that uses an elastomer pad for torque cushioning and vibration control.

BACKGROUND OF THE INVENTION

Automotive air conditioning compressors are typically powered from the engine through a belt driven pulley. Power is indirectly applied through an electromagnetic clutch that turns on and off in response to cooling demand, which is more efficient than running the compressor one-to-one with the engine at all times. The pulley is supported on the compressor housing for free rotation about the shaft on a bearing that fixes it axially relative to the shaft. An annular friction disk fixed to the pulley axially faces an annular magnetic armature with an axial gap therebetween. A magnetic coil on the housing, located close to the friction disk and armature, pulls them together with an axial stroke sufficient to close the gap so that the pulley rotation is translated to the armature.

How the torque translated to the armature is in turn translated to the compressor drive shaft depends on the physical connection between the armature and shaft. One type of clutch accomplishes the torque transmission with an axially flexible, annular elastomer pad, the inner edge of which is fixed to a central hub bolted to the shaft and the outer edge of which is fixed to the armature. The flexible pad allows some torsional wind up at initial engagement, and serves to control the incidence of resonant frequency. A good example of such an elastomer clutch is disclosed in coassigned U.S. Pat. No. 5,195,625. The concentricity of the armature relative to the central shaft and hub is entirely dependent on the radial integrity of the elastomer pad, since it is the only connection therebetween. Therefore, the patent just noted discloses cylindrical rings embedded in the elastomer pad to increase its radial stiffness and thereby keep it more nearly concentric to the shaft during operation.

SUMMARY OF THE INVENTION

The invention discloses an electromagnetically actuated elastomer clutch that provides even better concentricity control to the armature without affecting the flexibility of the elastomer pad.

In the embodiment disclosed, an annular, stamped steel outer ring, which is generally L-shaped in cross section, has an outer rim riveted to the armature, and a cylindrical sleeve with an axial length somewhat longer than the axial stroke necessary to pull the armature and pulley friction disk together. The outer edge of the elastomer pad is bonded to the inner surface of the sleeve, and the inner edge of the pad is bonded to the central hub on the compressor's central drive shaft. A generally annular, stamped steel guide plate has an inner edge that is welded to the hub, clear of the elastomer pad, and an outer cylindrical guide flange that extends axially over the outer surface of the sleeve, closely, but without binding.

As the clutch is actuated, the armature is pulled toward the pulley friction disk. The elastomer pad flexes axially in, as the outer ring sleeve slides axially within the guide plate flange. As the armature catches frictionally on the pulley disk, the elastomer pad can twist slightly, as the sleeve turns within the flange. The close, but sliding, confinement of the sleeve within the flange provides complete guidance, axial, radial, and circumferential, allowing the pad to be as flexible as necessary. The armature is thereby maintained concentric to the hub and central shaft.

DESCRIPTION OF THE PREFERRED EMBODIMENT

These and other features of the invention will appear from the following written description, and from the drawings, in which:

FIG. 1 is a side view of the end of a compressor with a preferred embodiment of the clutch of the invention cross sectioned and partially broken away, showing the clutch non actuated;

FIG. 2 an end view of FIG. 1;

Figure 1:
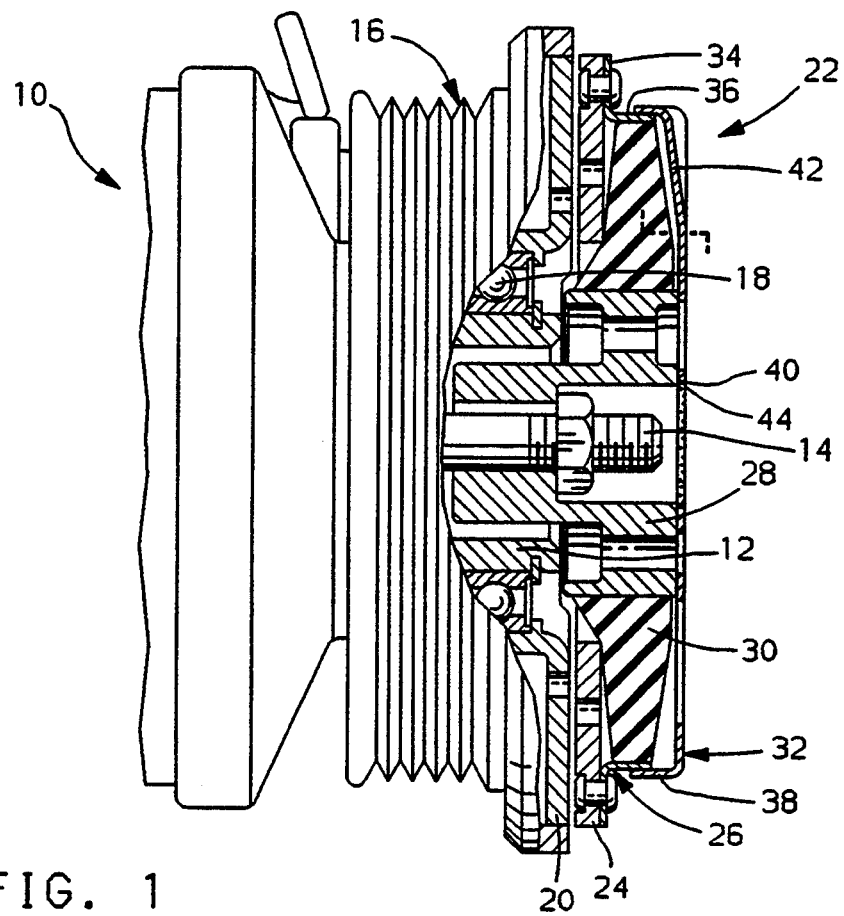

Referring first to FIG. 1, an automotive air conditioning compressor, indicated generally at (10), has a housing (12) that is solidly fixed to the vehicle body, and a central drive shaft (14), the axis of which serves as the axis of rotation of several other components. A powered rotor or pulley assembly, indicated generally at (16), is secured by a bearing (18) to housing (12) for free rotation about shaft (14), though not on shaft (14) per se. An electromagnetic coil, not illustrated, is located inboard of pulley assembly (16), fixed to housing (12). An annular drive member or friction disk (20) fixed to pulley assembly (16) also rotates freely about shaft (14), and is axially and radially located relative thereto by the bearing (18). Pulley assembly (16) is powered from the engine by a conventional belt, not illustrated. Power is transferred from pulley assembly (16) to shaft (14) indirectly, through the clutch assembly of the invention, indicated generally at (22).

Figure 2:
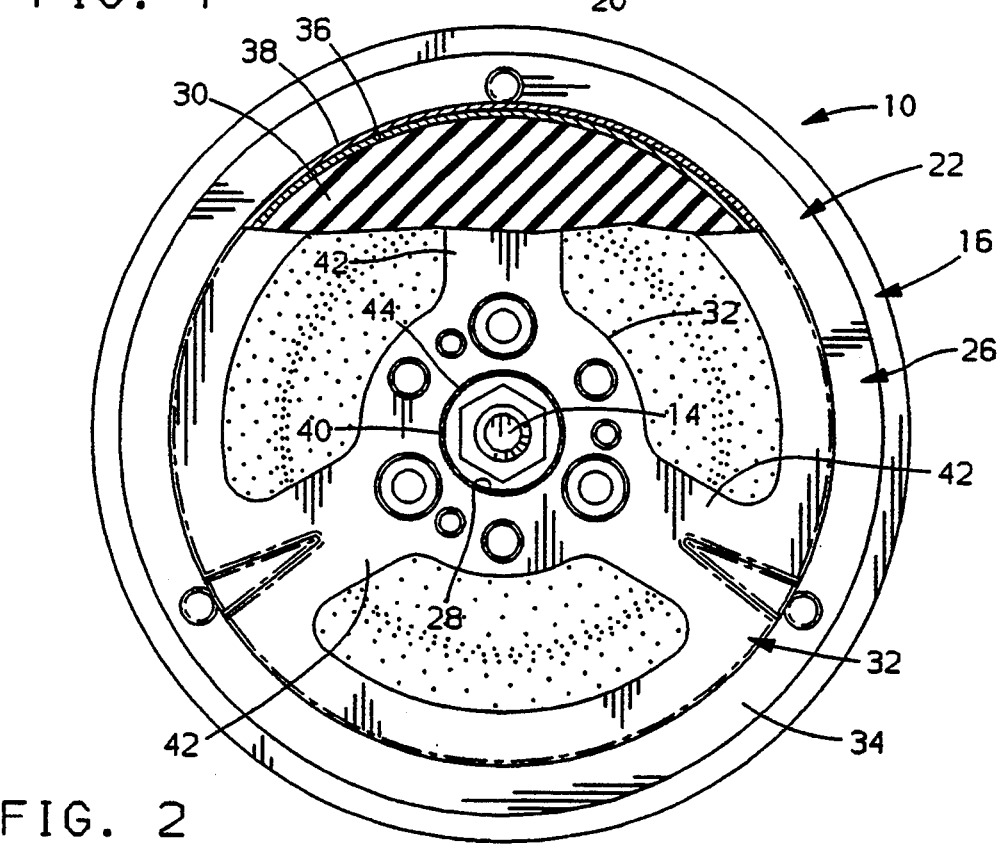

Referring next to FIGS. 1 and 2, clutch (22) includes an armature (24), outer ring (26), central hub (28), elastomer pad (30), and guide plate (32). Armature (24) is a ferrous metal member comparable in size to friction disk (20), and capable of making close, nonturning contact therewith when the two are pulled together. Outer ring (26) is a stamped steel part, L-shaped in radial cross section, with a flat, circular rim (34) and cylindrical sleeve (36) extending axially outwardly therefrom. Armature (24) is eventually riveted to rim (34) at three equidistant points, best seen in FIG. 2, which represents its only direct connection to clutch (22). Central hub (28) is a solid metal part, and would be adapted to be securely attached to shaft (14), either by bolting, press fitting, or other means. Before either outer ring (26) or hub (28) are attached to any other components, they are first bonded to the outer and inner edges respectively of elastomer pad (30) as part of the process by which pad (30) is molded. Pad (30) is like that disclosed in the patent referred to above, molded of a conventional rubber compound, such as Neoprene, and tapered in cross section. However, it need not have any reinforcing members molded into it. The specific details of pad (30), in terms of durometer, resilience, thickness, etc. are not crucial to the invention here, though they may be found in another coassigned patent, U.S. Pat. No. 5,219,273. What is significant is that pad (30) is inherently radially flexible, as well as axially and torsionally flexible. Axial and torsional flexibility are desirable to the operation of clutch (22), but the radial flexibility that is an inevitable by-product is not. The invention compensates for it, as is explained next.

Figure 3:
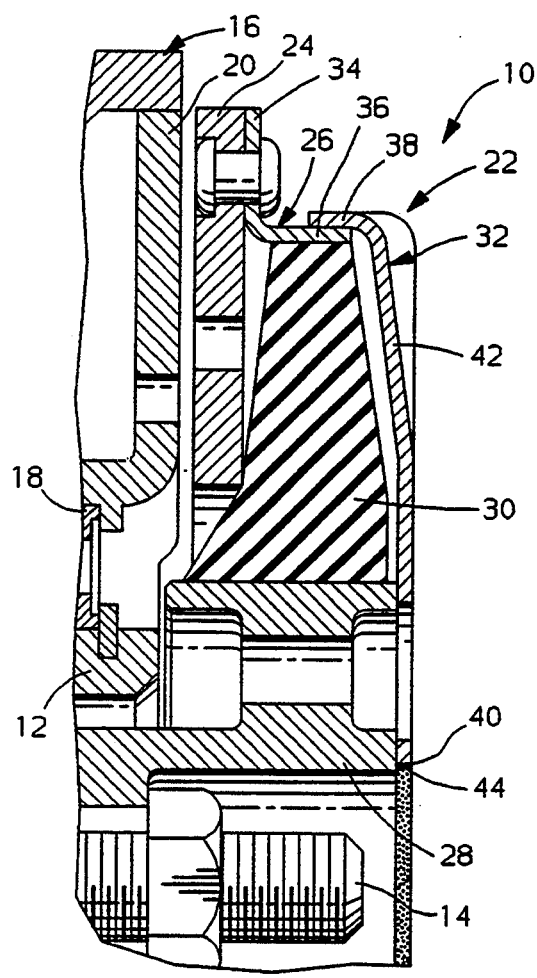
FIG. 3 is an enlargement of a portion of FIG. 1.
Figure 4:
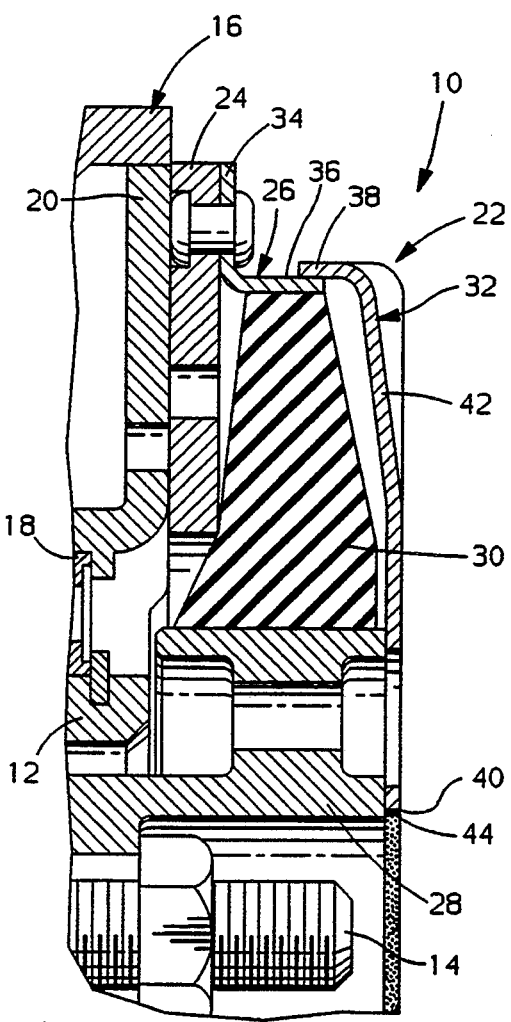
FIG. 4 is a view like FIG. 3, but showing the clutch actuated.

Referring next to FIGS. 2, 3 and 4, clutch (22) is completed by guide plate (32), which is also a steel stamping, with an outer cylindrical guide flange (38), an inner edge (40), and thee equidistant spokes (42) interconnecting the two. The diameter of inner edge (40) is slightly greater than the inner diameter of hub (28). The diameter of guide flange (38) is such that its inner surface can fit closely over the outer surface of sleeve (36), but not tightly, with just enough radial clearance that relative axial sliding and angular twisting is possible. Guide plate (32) is fixed to hub (28) by sliding flange (38) over sleeve (36) and then welding inner edge (40) to hub (28), at weld seam (44). The close fit of sleeve (36) within guide flange (38) maintains the of outer ring (26)-armature (24) assembly concentric to the guide plate (32)-hub (28) assembly, though there is no preferred angular or circumferential orientation of the two. Finally, clutch (22) is installed by bolting hub (28) to shaft (14). Armature (24) is left with a predetermined axial gap from disk (20), which is generally between (15) and (40) thousandths of an inch. The clutch (22) must be capable of flexing over a predetermined axial stroke of at least that much, plus an allowance for mutual wear between the armature (24) and disk (20). In turn, the axial length of sleeve (36), and the resultant axial overlap with flange (38), must be at least as great as the necessary stroke. As a practical matter, it will be significantly longer than that, however, since sleeve (36) encompasses the outer edge of pad (30), which is thicker than the minimal required stroke.

Referring next to FIGS. 3 and 4, the operation of clutch (22) is illustrated. When the coil is energized in response to demand from the air conditioning system controller, armature (24) is pulled axially into disk (20). Armature (24) is axially guided in its motion as sleeve (36) is pulled partially out of guide flange (38) and pad (30) is flexed axially inwardly. When armature (24) hits disk (20) and catches, clutch (22) eventually spins one-to-one with pulley assembly (16), powering shaft (14). The initial transmission of torque shock to shaft (14) is accompanied by a slight torsional twisting of pad (30), which is not prevented by the guide flange (38), because of the relative twisting of sleeve (36) that is possible. As clutch (22) spins, sleeve (36), is maintained concentric to shaft (14) by flange (38), as are armature (24) and pad (30). The radial flexibility or slight whirling that pad (30) and armature (24) could otherwise exhibit about shaft (14) is prevented. Guide plate (32) therefore provides complete guidance to clutch (22), both axial guidance as armature (24) is pulled in, circumferential guidance as pad (30) twists just after actuation, and radial guidance during operation, all without interfering with the axial flexing or twisting of pad (30). In addition, the presence of guide plate (32) in front of pad (30) provides at least some protection against impact damage, while still providing access for cooling airflow between the spokes (42). It is significant that there is no extra radial space taken up by guide plate (32), and the extra axial space it occupies in front of hub (28) is minimal, consisting only of the thickness of the stock from which it is stamped. That is, the axial space used for the axial guiding motion of clutch (22) is only the axial overlap between sleeve (36) and flange (38), axial space which is already there, at the outer edge of pad (30). The area surrounding the outer edge of pad (30) is preferable, in terms of providing axial guidance and keeping armature (24) concentric to shaft (14), to other possibilities, such as the smaller diameter of hub (28).

Variations in the embodiment disclosed could be made. For example, the guide flange (38), instead of being circumferentially complete, could consist instead of several discrete, equally spaced elements that would overlap and overlie sleeve (36), on a circle of the same diameter as flange (38). The circumferentially complete flange (38) is easy to stamp, however, and provides complete guidance all the way round. Therefore, it will be understood that it is not intended to limit the invention to just the embodiment disclosed.

The embodiments of the invention in which an exclusive property or privilege are defined as follows:

1. In an electromagnetic clutch assembly of the type having a central drive shaft, a central hub fixed to said drive shaft, and an annular elastomeric pad having an inner edge fixed to said hub and an outer edge fixed to an annular armature plate and capable of flexing axially relative to said hub over a predetermined axial stroke, the improvement comprising, a generally cylindrical sleeve fixed to said elastomeric pad outer edge surrounding said central shaft and having an axial length at least equal to said stroke, and, a generally annular guide plate having an inner edge fixed to said hub and outer cylindrical guide flange that extends axially over said sleeve in sliding engagement therewith, whereby said elastomeric pad is radially confined and axially guided relative to said central shaft so as to remain substantially concentric thereto as it flexes.

2. An electromagnetic clutch assembly for use with a fluid pumping apparatus of the type having a central drive shaft and a powered rotor with a generally annular drive member supported for free rotation about said shaft, said clutch assembly comprising, a central hub adapted to be fixed to said drive shaft, an annular elastomeric pad having an inner edge fixed to said hub and an outer edge, an annular armature fixed to said pad so as to be capable of moving axially over a predetermined axial stroke as said pad flexes axially relative to said hub, a generally cylindrical sleeve fixed to said elastomeric pad outer edge and armature plate and surrounding said hub with having an axial length at least equal to said stroke, and, a generally annular guide plate having an inner edge fixed to said hub and outer cylindrical guide flange that axially overlaps said sleeve in sliding engagement therewith, whereby said elastomeric pad and armature plate are both radially confined and axially guided relative to said hub so as to remain substantially concentric thereto as said elastomeric pad is flexed to bring said armature plate and drive member into and out of contact.

3. In an electromagnetic clutch assembly of the type having a central drive shaft, a central hub fixed to said drive shaft, an annular armature plate surrounding said shaft, and an annular elastomeric pad having an inner edge fixed to said hub, an outer edge generally co-radial with said armature plate, and capable of flexing axially relative to said hub over a predetermined axial stroke, the improvement comprising, an outer ring having a generally annular rim fixed to said armature plate and a generally cylindrical sleeve fixed to said elastomeric pad outer edge and surrounding said central shaft and having an axial length at least equal to said stroke, and, a generally annular guide plate having an inner edge fixed to said hub and outer cylindrical guide flange that extends axially over said sleeve in sliding engagement therewith, whereby said elastomeric pad and armature plate are both radially confined and axially guided relative to said central shaft so as to remain substantially concentric thereto as said elastomeric pad is allowed to flex.

* * * * *